US012600491B2

(12) United States Patent
John et al.

(10) Patent No.: US 12,600,491 B2
(45) Date of Patent: Apr. 14, 2026

(54) PUSH BUTTON MOTION INDICATOR MECHANISM

(71) Applicant: Hamilton Sundstrand Corporation, Charlotte, NC (US)

(72) Inventors: Rajeev Tholammakkal John, Bangalore (IN); Sreejith Purushothaman, Alappuzha (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 447 days.

(21) Appl. No.: 18/315,739

(22) Filed: May 11, 2023

(65) Prior Publication Data

US 2024/0270372 A1 Aug. 15, 2024

(30) Foreign Application Priority Data

Feb. 15, 2023 (IN) .............................. 202311010117

(51) Int. Cl.
*B64D 45/00* (2006.01)
*B64C 13/28* (2006.01)
(52) U.S. Cl.
CPC .......... *B64D 45/0005* (2013.01); *B64C 13/28* (2013.01)
(58) Field of Classification Search
CPC .......... B64D 45/0005; B64D 2045/001; B64C 13/28; B64C 9/24
See application file for complete search history.

(56) References Cited

U.S. PATENT DOCUMENTS 4,026,153 A * 5/1977 Silverwater ............. G01L 19/12
137/557
4,251,789 A 2/1981 Russell et al.

4,453,449 A * 6/1984 Hollmann ............... F41F 3/052
403/322.2
4,579,201 A 4/1986 Tiedeman
4,759,750 A * 7/1988 DeVries ................ A61M 5/315
116/DIG. 17

(Continued)

FOREIGN PATENT DOCUMENTS

WO 2005001281 A2 1/2005

OTHER PUBLICATIONS

Extended European Search Report corresponding to EP Application No. 24157827.7; Issue Date, Jul. 9, 2024; 11 pages.

*Primary Examiner* — Kristina M Deherrera
*Assistant Examiner* — Tania Courson
(74) *Attorney, Agent, or Firm* — CANTOR COLBURN LLP

(57) ABSTRACT

A motion indicator includes a housing and a plunger extending from a first housing end of the housing and axially movable relative to the housing. The plunger is biased into an axially extended position via a plunger biasing element, and is configured to detect motion of a component adjacent to a plunger tip. A push button is located at a second housing end of the housing and is axially moveable relative to the housing. The push button is biased toward an axially extended position via a biasing element. A retaining assembly is configured to retain the push button in an axially retracted position. The retaining assembly is configured to release the push button and allow the button biasing element to urge the push button toward the axially extended position when the plunger is urged toward a retracted position via motion of the component adjacent to the plunger tip.

14 Claims, 6 Drawing Sheets

(56)                    References Cited

U.S. PATENT DOCUMENTS

| | | | |
|---|---|---|---|
| 5,542,150 | A  * | 8/1996 | Tu ........................... E05B 65/52 |
| | | | 16/113.1 |
| 5,901,817 | A | 5/1999 | Gitnes |
| 6,823,751 | B1 * | 11/2004 | Young .................... F16L 55/48 |
| | | | 73/1.18 |
| 6,861,602 | B2 * | 3/2005 | Juga ....................... H01H 13/06 |
| | | | 200/341 |
| 7,437,919 | B1 * | 10/2008 | Wu .................... B60C 23/0496 |
| | | | 73/146 |
| 9,482,255 | B2 * | 11/2016 | Changsrivong ....... F16B 21/186 |
| 10,031,546 | B2 * | 7/2018 | Crandall-Seibert .......................... |
| | | | B64C 13/042 |
| 10,894,595 | B1 | 1/2021 | Wright et al. |
| 11,384,785 | B2 * | 7/2022 | Schlegel .............. F16B 21/165 |
| 11,486,457 | B2 | 11/2022 | Szynkaruk et al. |
| 12,338,940 | B2 * | 6/2025 | Laymon .................. F16L 55/48 |
| 2008/0185242 | A1 | 8/2008 | Mayer et al. |
| 2021/0380226 | A1 | 12/2021 | Popov |

\* cited by examiner

-PRIOR ART-

PUSH BUTTON MOTION INDICATOR MECHANISM

CROSS-REFERENCE TO RELATED APPLICATIONS

This application claims the benefit of India Provisional Application No. 202311010117 filed Feb. 15, 2023, the disclosure of which is incorporated herein by reference in its entirety.

BACKGROUND

Exemplary embodiments pertain to the art of motion indicator mechanisms, and in particular to jam indicator mechanisms for high lift torque limiters of, for example, aircraft control surface drive mechanisms.

Control surfaces of aircraft, such as flaps or slats, are moved and controlled by rotary gear actuators along with rack and pinion devices operably connected to the control surfaces. These rotary gear actuators drive the control surfaces to selected positions indicated by flight control systems or pilot input to the controls, and to maintain the control surfaces at the selected positions. When the actuator exceeds a torque threshold during operation, a torque limiter connected in-line to the actuator acts to isolate the downstream components and divert the overload to an earth structure while a jam is indicated by a jam indicator. The current jam indicator is a lever type mechanism, where a plunger acts on a pivoted indicator arm. The indicator arm is in a first position if there is no jam, and a second position if a jam is indicated. In the first position, the indicator arm is retained by a spring clip, while in the second position the indicator arm is released from the spring clip. The displacement of the pivoted indicator arm depends on the length of the arm. To be noticeable via visual inspection, a large indicator arm is needed which in turn requires a larger housing to contain the arm. Further, the position of the indicator arm may depend on retention by the spring clip, and failure of the spring clip may result in a false indication of a jam.

BRIEF DESCRIPTION

In one embodiment, a motion indicator includes a housing and a plunger extending from a first housing end of the housing and axially movable relative to the housing. The plunger is biased into an axially extended position relative to the housing via a plunger biasing element, and the plunger is configured to detect motion of a component adjacent to a plunger tip. A push button is located at a second housing end of the housing and is axially moveable relative to the housing. The push button is biased toward an axially extended position relative to the housing via a biasing element. A retaining assembly is configured to retain the push button in an axially retracted position relative to the housing. The retaining assembly is configured to release the push button and allow the button biasing element to urge the push button toward the axially extended position when the plunger is urged toward a retracted position via motion of the component adjacent to the plunger tip.

Additionally or alternatively, in this or other embodiments the housing includes an outer sleeve and an inner sleeve positioned radially inboard of the outer sleeve. The push button is located radially between the outer sleeve and the inner sleeve, and the inner sleeve is located radially between the plunger and the push button.

Additionally or alternatively, in this or other embodiments the retaining assembly includes one or more retaining balls positioned in a ball opening in the inner sleeve, and one or more retaining elements extending radially inwardly from the push button body to interact with the one or more retaining balls and retain the push button in the retracted position.

Additionally or alternatively, in this or other embodiments the one or more retaining balls are configured to move radially inwardly when the plunger is urged toward the retracted position, thus releasing the push button.

Additionally or alternatively, in this or other embodiments the one or more retaining elements includes one or more disc springs.

Additionally or alternatively, in this or other embodiments the one or more retaining elements includes one or more tine springs.

Additionally or alternatively, in this or other embodiments the spring element is axially retained between a housing wall and a flange of the push button.

In another embodiment, a method of indicating motion of a component includes locating a plunger of a motion indicator adjacent the component. The plunger is located in a housing and extends from a first housing end of the housing and is axially movable relative to the housing. The plunger is biased into an axially extended position relative to the housing via a plunger biasing element. The plunger is urged toward a retracted position via motion of the component toward the plunger. A retainer of a push button positioned in the housing is released via movement of the plunger toward the retracted position. The push button is located at a second housing end of the housing and is axially moveable relative to the housing. The push button is biased toward an axially extended position relative to the housing via a biasing element. The push button is urged toward the axially extended position via the biasing element thereby indicating motion of the component.

Additionally or alternatively, in this or other embodiments the housing includes an outer sleeve and an inner sleeve located radially inboard of the outer sleeve. The push button is positioned radially between the outer sleeve and the inner sleeve, and the inner sleeve is located radially between the plunger and the push button.

Additionally or alternatively, in this or other embodiments the retaining assembly includes one or more retaining balls located in a ball opening in the inner sleeve. The push button is retained in the retracted position via interaction between one or more retaining elements extending radially inwardly from the housing and the one or more retaining balls.

Additionally or alternatively, in this or other embodiments the one or more retaining balls are moved radially inwardly when the plunger is urged toward the retracted position, thus releasing the push button.

Additionally or alternatively, in this or other embodiments the one or more retaining elements includes one or more disc springs.

Additionally or alternatively, in this or other embodiments the one or more retaining elements includes one or more tine springs.

Additionally or alternatively, in this or other embodiments the spring element is axially retained between a housing wall and a flange of the push button.

In yet another embodiment, a control surface actuation system includes an actuator operably connected to a control surface, and a jam detecting apparatus of the actuator including an actuator sleeve configured to move axially along an actuator housing when the actuator is subjected to one of an overtorque or jam condition. A jam indicator is in operable communication with the actuator sleeve. The jam indicator includes an indicator housing, and a plunger extending from a first housing end of the indicator housing and axially movable relative to the indicator housing. The plunger is biased into an axially extended position relative to the indicator housing via a plunger biasing element, and the plunger is configured to detect motion of a component adjacent to a plunger tip. A push button is located at a second housing end of the indicator housing and is axially moveable relative to the indicator housing. The push button is biased toward an axially extended position relative to the indicator housing via a button biasing element. A retaining assembly is configured to retain the push button in an axially retracted position relative to the indicator housing. The retaining assembly is configured to release the push button and allow the button biasing element to urge the push button toward the axially extended position when the plunger is urged toward a retracted position via motion of the component adjacent to the plunger tip, thereby indicating that the actuator has been subjected to one of an overtorque or jam condition.

Additionally or alternatively, in this or other embodiments the indicator housing includes an outer sleeve and an inner sleeve located radially inboard of the outer sleeve. The push button is located radially between the outer sleeve and the inner sleeve. The inner sleeve is located radially between the plunger and the push button.

Additionally or alternatively, in this or other embodiments the retaining assembly includes one or more retaining balls located in a ball opening in the inner sleeve, and one or more retaining elements extending radially inwardly from the indicator housing to interact with the one or more retaining balls and retain the push button in the retracted position.

Additionally or alternatively, in this or other embodiments the one or more retaining balls are configured to move radially inwardly when the plunger is urged toward the retracted position, thus releasing the push button.

Additionally or alternatively, in this or other embodiments the one or more retaining elements includes one or more disc springs or one or more tine springs.

Additionally or alternatively, in this or other embodiments the button spring element is axially retained between an indicator housing wall and a flange of the push button.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limited with reference to the Figures.

Figure 1:
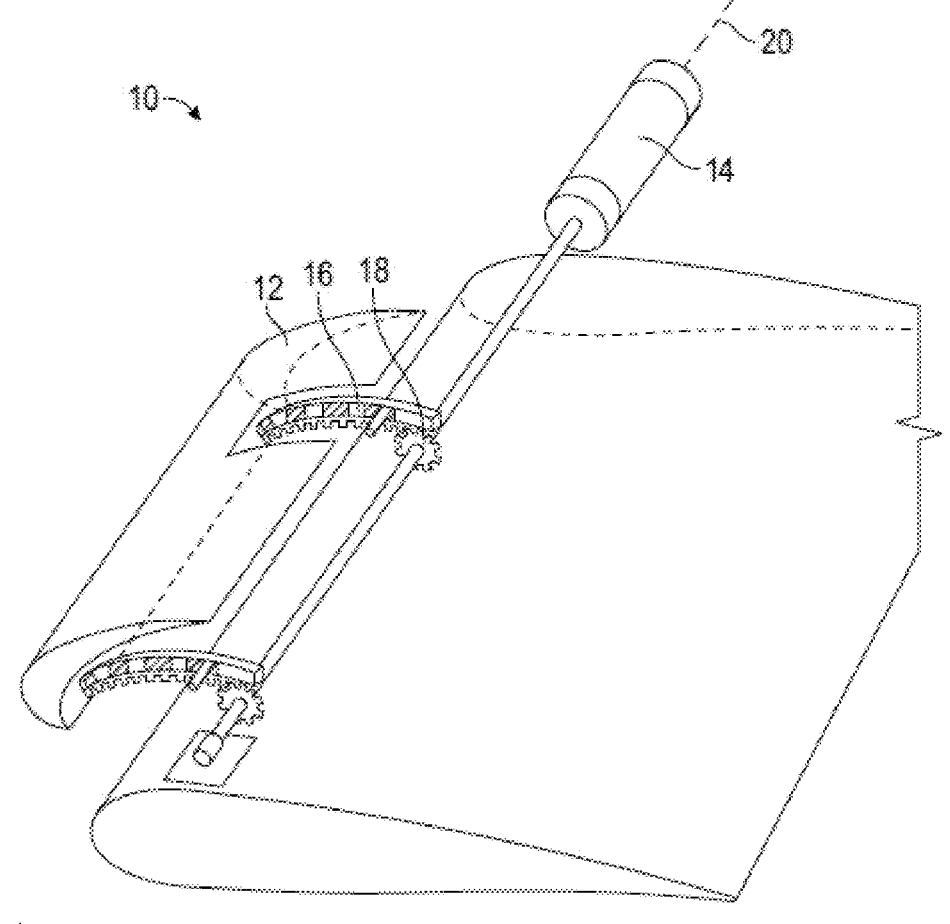
FIG. 1 is a schematic illustration of a prior art control surface actuation system.

Referring to FIG. 1, shown is a schematic illustration of an embodiment of a control surface actuation system 10 for, for example, an aircraft. The system 10 includes a control surface 12, for example, a slat, a flap or a vane, operably connected to a rotary actuator 14, for example, a mechanical, electro-mechanical, hydraulic or electro-hydraulic actuator. In some embodiments, the control surface 12 is operably connected to the actuator 14 via a rack 16 and pinion 18 arrangement. Operation of the actuator 14 rotates the pinion 18 about a pinion axis 20, moving the rack relative to the pinion 18, and thus moving the control surface 12. One skilled in the art will readily appreciate that while a rack 16 and pinion 18 arrangement is illustrated and described herein, other arrangements may be utilized to operably connect the actuator 14 to the control surface 12.

Figure 2:
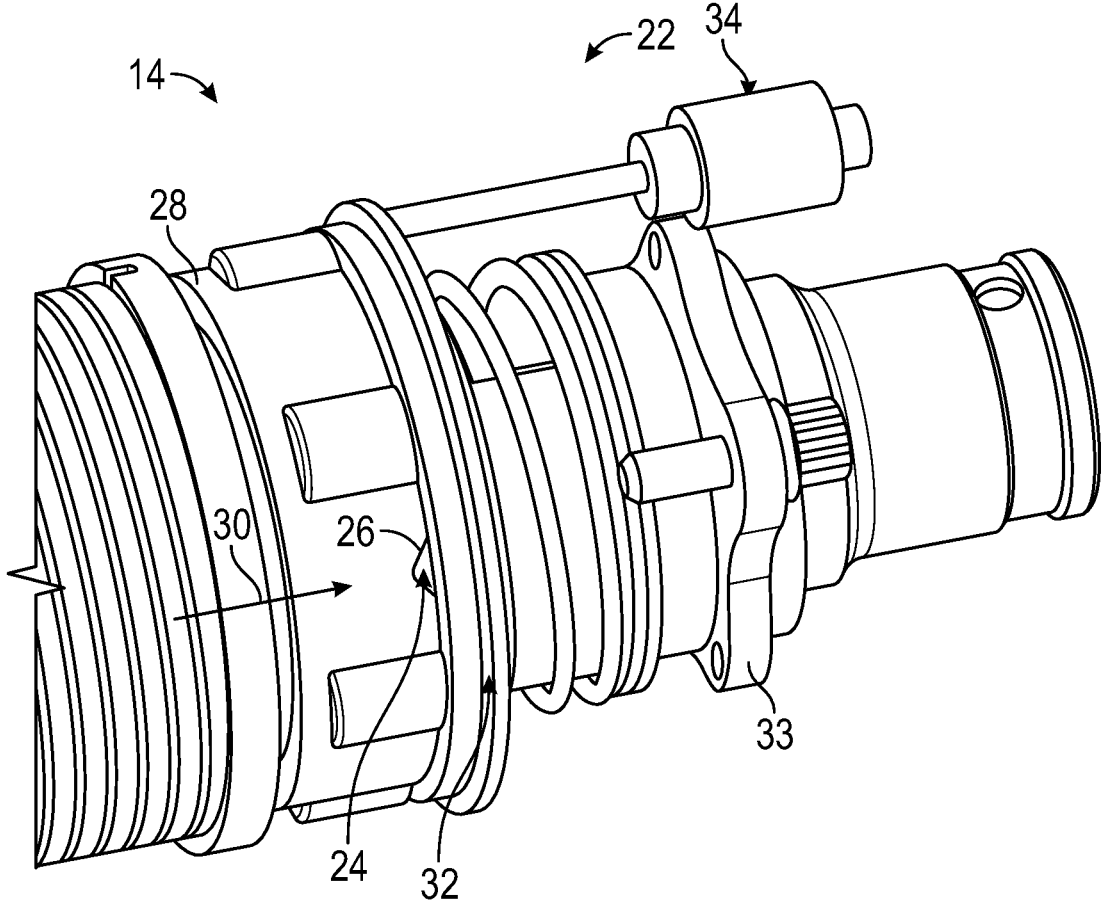
FIG. 2 is a schematic illustration of an embodiment of an actuator with a jam indicator.

Referring now to FIG. 2, when the actuator 14 exceeds a torque threshold during a jam event, a torque limiter within the actuator acts to isolate the downstream components and divert the overload to an earth structure while a jam is indicated by a jam indicator mechanism 34 which may indicate potential damage to the system 10. The torque limiter within the actuator 14 includes balls 24 positioned in detents 26 in the output shaft 28 of the actuator 14. When the actuator 14 is subjected to an overtorque or jam condition, the balls 24 climb the detents 26 along an actuator axial direction 30, and pushes a sleeve 32 along the same actuator axial direction 30. Movement of this sleeve 32 in turn triggers activation of a jam indicator 34 fixed to the actuator housing 33.

Figure 3:
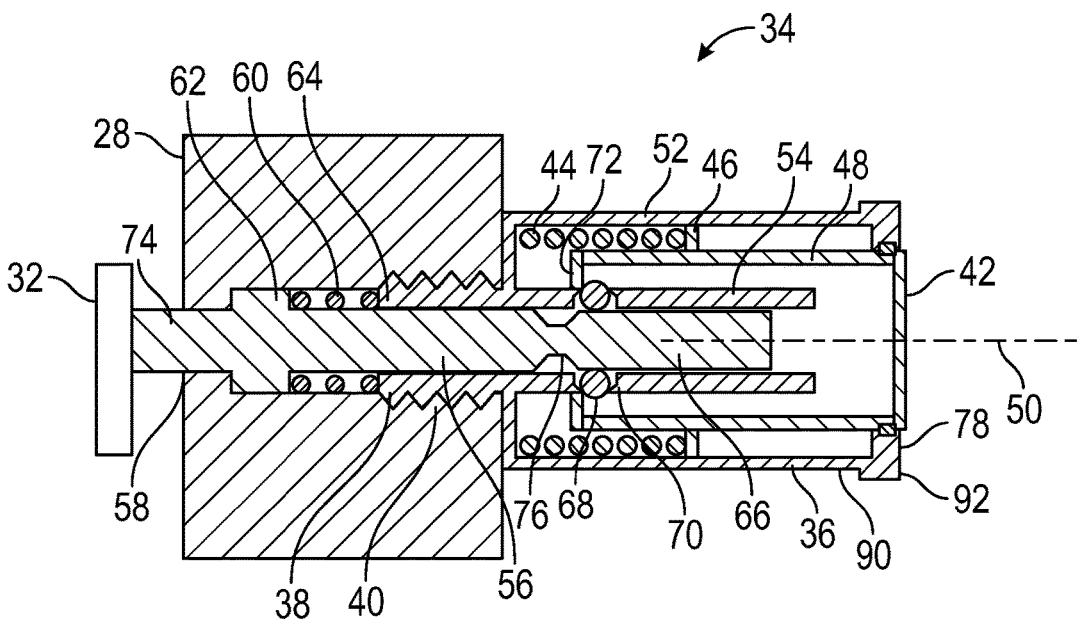
FIG. 3 is a schematic illustration of an embodiment of a jam indicator in a retracted position.

Referring to FIG. 3, illustrated is an embodiment of a jam indicator 34 in a set position, not indicating a jam condition of the actuator 14. Though the apparatus is described herein as a jam indicator, one skilled in the art will readily appreciate that the present indicator may be utilized in other applications where a small motion is mechanically detected and mechanically amplified and indicated via a push button. The jam indicator 34 includes an indicator housing 36 fixed relative to the actuator housing 28. In some embodiments, the indicator housing 36 includes an indicator thread 38 receivable into a complimentary actuator thread 40 in the actuator housing 28 to secure the indicator housing 36 at the actuator housing 28. A push button 42 is located inside the indicator housing 36 and the position of the push button 42 relative to indicator housing 36 is a visual indication of whether or not the actuator 14 has been subjected to an overtorque or jam condition. When the push button 42 is in a retracted position as in FIG. 3, the jam indicator 34 indicates that the actuator 14 has not been subjected to an overtorque or jam condition. On the other hand, when the push button 42 is in an extended position as shown in FIG. 4, the jam indicator 34 indicates that the actuator 14 has been subjected to an overtorque or jam condition.

Referring again to FIG. 3, the push button 42 is biased toward the extended position by a spring 44 disposed in the indicator housing 36. In some embodiments the spring 44 is interactive with a push button flange 46 extending radially outwardly from a push button body 48, relative to an indicator central axis 50. The indicator housing 36 includes an outer sleeve 52 defining an outer surface of the indicator housing 36, and an inner sleeve 54 located radially inboard and spaced apart from the outer sleeve 52. In some embodiments, such as shown in FIG. 3, the push button body 48 is positioned radially between the inner sleeve 54 and the outer sleeve 52, and the spring 44 is located radially between the push button body 48 and the outer sleeve 52. In some embodiments, a housing end 78 of the indicator housing 36 is installed to a housing body 90 of the indicator housing 36 via a threaded joint 92, allowing for ease of assembly and installation of the various components into the indicator housing 36.

Figure 5:
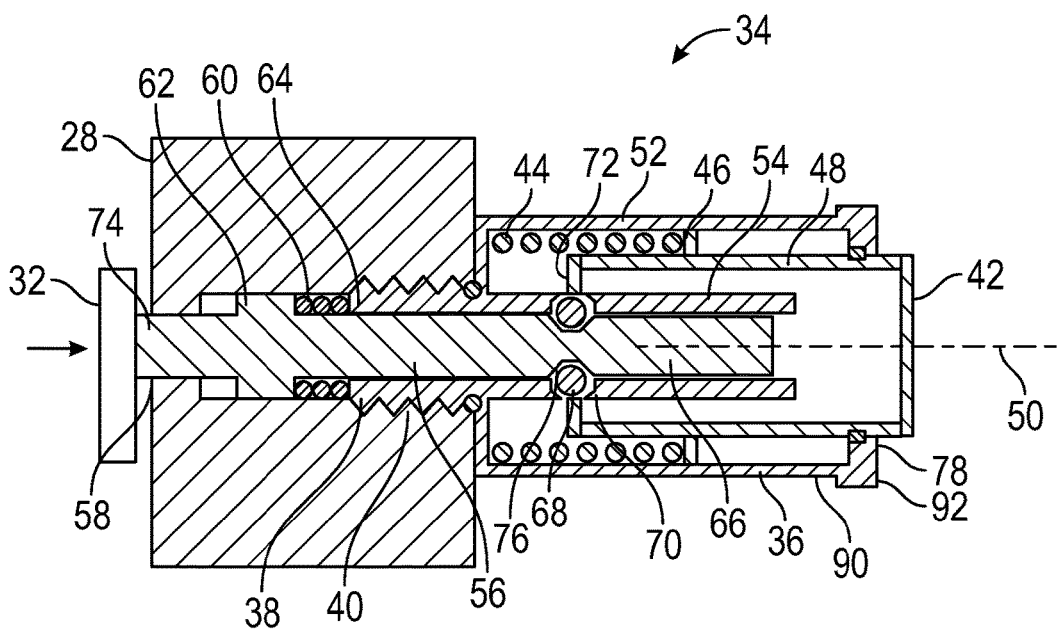
FIG. 5 is a schematic illustration of an embodiment of a jam indicator during activation.

Referring again to FIG. 3, the jam indicator 34 further includes a plunger 56 positioned radially inside of the inner sleeve 54. The plunger 56 extends through a housing opening 58 axially toward the sleeve 32 and is interactive therewith as will be described further below. The plunger 56 is biased toward an extended position, as illustrated in FIG. 3, by a biasing element, such as a plunger spring 60 located axially between a plunger flange 62 and a housing end 64. The plunger 56 includes a plunger body 66 that extends axially inside the inner sleeve 54 toward the push button 42. The push button 42 is retained in the retracted position by one or more retaining balls 68 located in a ball opening 70 in the inner sleeve 54. When the plunger 56 is in the extended position the plunger body 66 urges the retaining balls 68 radially outwardly in the ball opening 70. In this position, the retaining balls 68 interfere with a retaining feature of the push button 42. In some embodiments, such as shown in FIG. 3, the retaining feature is a retaining flange 72 extending radially inwardly. As will be described further, in other embodiments other retaining features may be utilized. Referring now to FIG. 5, in the event of an overload, the sleeve 32 of the torque limiter pushes a plunger tip 74 of the plunger 56, the plunger 56 overcomes the biasing force of the plunger spring 60 and moves axially toward a retracted position. The axial movement of the plunger 56 allows the retaining balls 68 to move radially inwardly into a plunger pocket 76 in the plunger body 66. As such, the retaining balls 68 move out of contact with the retaining flange 72 allowing the push button 42 to move axially toward the extended position.

Figure 4:
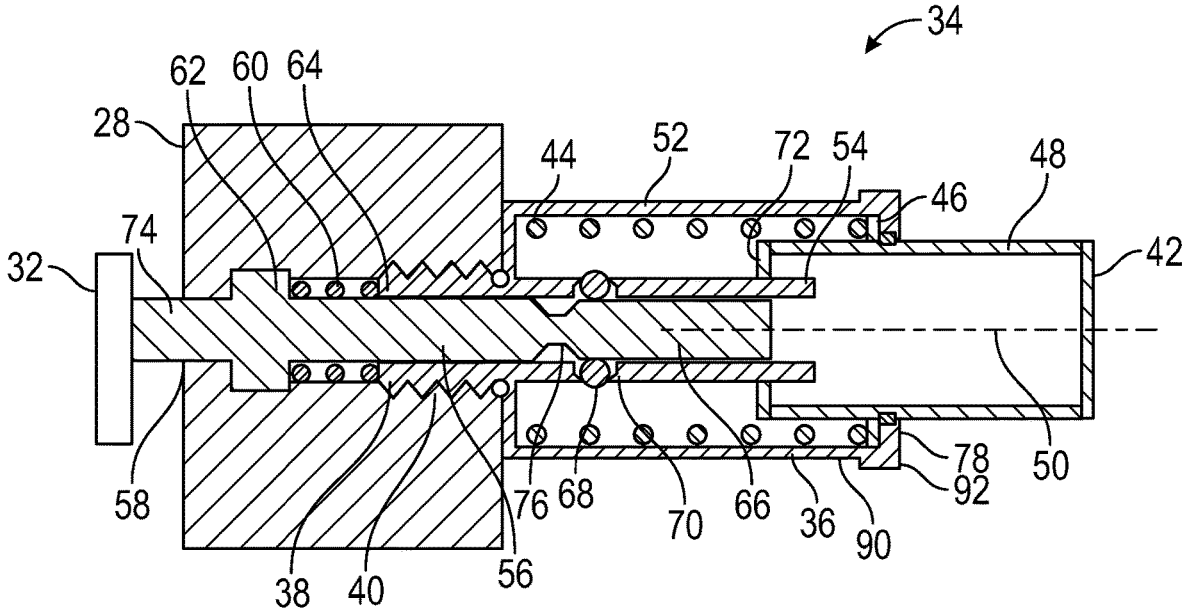
FIG. 4 is a schematic illustration of an embodiment of a jam indicator in an extended position.

Referring now to FIG. 4, when the push button 42 is in the fully extended position, the push button flange 46 contacts the housing end 78 of the indicator housing 36, thus stopping axial travel of the push button 42. When the overload is released the sleeve 32 of the actuator 14 moves away from the plunger tip 74 and the plunger spring 60 again urges the plunger 56 towards the extended position, thus urging the retaining balls 68 radially outwardly in the ball openings 70.

Figure 6:
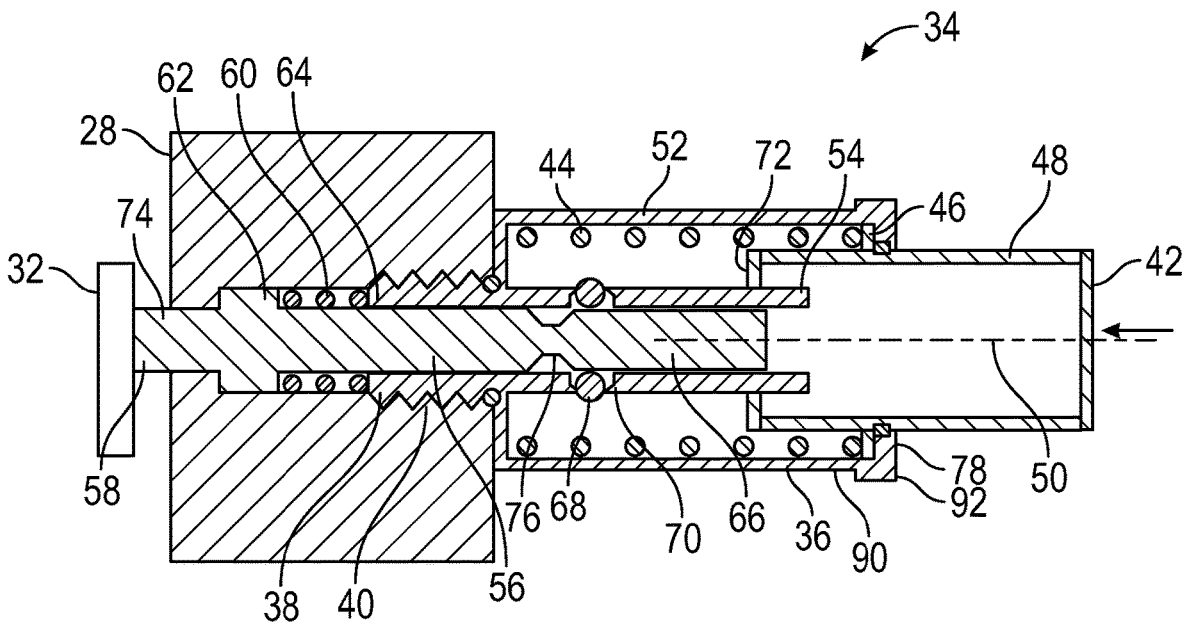
FIG. 6 is a schematic illustration of an embodiment of a jam indicator in a partially retracted position.
Figure 7:
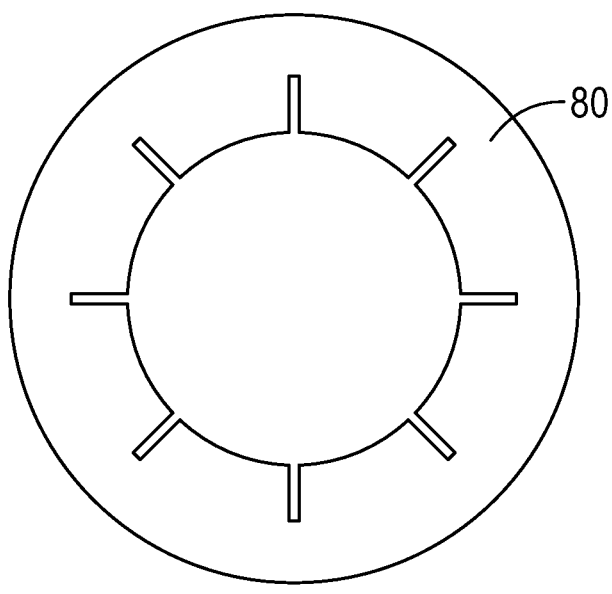
FIG. 7 is a side view of an embodiment of a retaining feature of a jam indicator.
Figure 8:
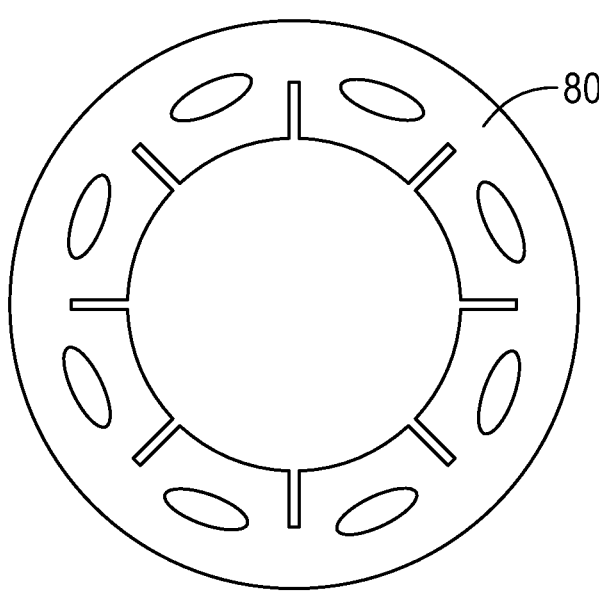
FIG. 8 is a side view of another embodiment of a retaining feature of a jam indicator.

Referring now to FIG. 6, to reset the push button 42, it is necessary to push the push button 42 axially to overcome the biasing force of the spring 44 and move the retaining feature 72 axially past the retaining balls 68. As such, in some embodiments, such as in FIGS. 6, 7 and 8, the retaining feature 72 is a slotted disc spring 80, examples of which are illustrated in FIGS. 7 and 8. The disc springs 80 are flexible allowing for movement of the disc springs 80 over and past the retaining balls 68 to reset the push button 42. The disc springs 80, however, provide sufficient retention force to maintain retention of the push button 42 in the retracted position, until released by movement of the plunger 56. The specific shape, thickness, material and other properties of the disc springs 80 may be varied to achieve the desired flexibility for ease of reset of the pushbutton 42, while providing a required retention force to retain the push button 42 in the retracted position to prevent inadvertent deployment of the push button 42.

Figure 9:
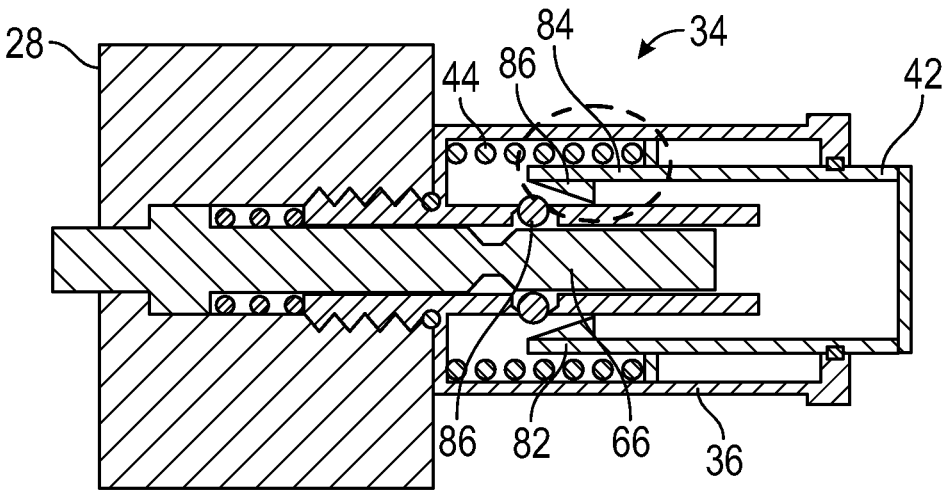
FIG. 9 is a schematic illustration of yet another embodiment of a retaining feature of a jam indicator.
Figure 10:
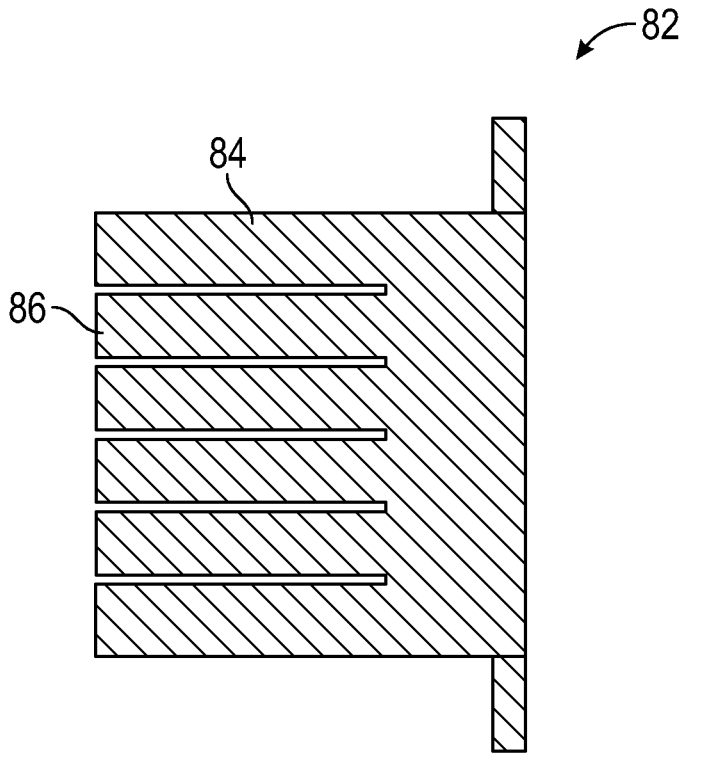
FIG. 10 is a plan view of an embodiment of a retaining feature of a jam indicator.

Another embodiment is illustrated in FIGS. 9 and 10, in which the retention feature is a tine spring 82 formed in the pushbutton 42. The tine spring 82 includes a plurality of axially extending tine elements 84, with each tine element 84 including a tine barb 86 extending radially inwardly. The tine elements 84 are sufficiently flexible to allow the tine elements 84 to move around and past the retaining balls 68, where the tine barbs 86 retain the push button 42 in the retracted position. The specific shape, thickness, material and other properties of the tine elements 84 and the tine barbs 86 may be varied to achieve the desired flexibility for ease of reset of the pushbutton 42, while providing a required retention force to retain the push button 42 in the retracted position to prevent inadvertent deployment of the push button 42.

The jam indicator 34 configurations disclosed herein provide a compact solution that reduces volume and weight of the mechanism, relative to prior art solutions. It is scalable, allowing for use wherever a small movement can be mechanically sensed and mechanically amplified and indicated through a compact push button. Further, the moving parts are contained in a housing, thus not exposed to harsh operating environments.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A motion indicator, comprising:
   a housing;
   a plunger extending from a first housing end of the housing and axially movable relative to the housing, the plunger biased into an axially extended position relative to the housing via a plunger biasing element, the plunger configured to be axially displaced via a force applied to a plunger tip;
   a push button disposed at a second housing end of the housing and axially moveable relative to the housing, the push button biased toward an axially extended position relative to the housing via a button biasing element;

a retaining assembly configured to retain the push button in an axially retracted position relative to the housing;

wherein the retaining assembly is configured to release the push button and allow the button biasing element to urge the push button toward the axially extended position when the plunger is urged toward a retracted position via the force applied to the plunger tip;

wherein the housing includes:

an outer sleeve; and and an inner sleeve disposed radially inboard of the outer sleeve;

wherein the push button is located radially between the outer sleeve and the inner sleeve; and wherein the inner sleeve is located radially between the plunger and the push button; and wherein the retaining assembly includes:

one or more retaining balls disposed in a ball opening in the inner sleeve; and one or more retaining elements extending radially inwardly from the push button body to interact with the one or more retaining balls and retain the push button in the retracted position;

wherein the plunger includes a pocket configured such that, when the plunger is urged toward a retracted position, the retaining balls are free to move radially inwardly into said pocket, thereby releasing the push button and allowing the button biasing element to urge the push button toward the axially extended position.

2. The motion indicator of claim 1, wherein the one or more retaining balls are configured to move radially inwardly when the plunger is urged toward the retracted position, thus releasing the push button.

3. The motion indicator of claim 1, wherein the one or more retaining elements includes one or more disc springs.

4. The motion indicator of claim 1, wherein the one or more retaining elements includes one or more tine springs.

5. The motion indicator of claim 1, wherein the button biasing element is axially retained between a housing end and a flange of the push button.

6. A method of indicating motion, comprising:

locating a plunger of a position indicator, the plunger disposed in a housing and extending from a first housing end of the housing and axially movable relative to the housing, the plunger biased into an axially extended position relative to the housing via a plunger biasing element;

urging the plunger toward a retracted position by applying an axial force to a plunger tip of the plunger;

releasing a retaining assembly of a push button disposed in the housing via movement of the plunger toward the retracted position, the push button disposed at a second housing end of the housing and axially moveable relative to the housing, the push button biased toward an axially extended position relative to the housing via a button biasing element; and urging the push button toward the axially extended position via the button biasing element thereby indicating a detected axial displacement of the plunger;

wherein the housing includes:

an outer sleeve; and and an inner sleeve disposed radially inboard of the outer sleeve; and further comprising positioning the push button radially between the outer sleeve and the inner sleeve; and locating the inner sleeve radially between the plunger and the push button;

wherein the retaining assembly includes one or more retaining balls disposed in a ball opening in the inner sleeve; and retaining the push button in the retracted position via interaction between one or more retaining elements extending radially inwardly from the housing and the one or more retaining balls;

wherein the plunger includes a pocket configured such that, when the plunger is urged toward a retracted position, the retaining balls are free to move radially inwardly into said pocket, thereby releasing the push button and allowing the button biasing element to urge the push button toward the axially extended position.

7. The method of claim 6, further comprising moving the one or more retaining balls radially inwardly when the plunger is urged toward the retracted position, thus releasing the push button.

8. The method of claim 6, wherein the one or more retaining elements includes one or more disc springs.

9. The method of claim 6, wherein the one or more retaining elements includes one or more tine springs.

10. The method of claim 6, wherein the button biasing element is axially retained between a housing end and a flange of the push button.

11. A control surface actuation system, comprising:

an actuator operably connected to a control surface:

a jam detecting apparatus of the actuator including an actuator sleeve configured to move axially along an actuator housing when the actuator is subjected to one of an overtorque or jam condition;

a jam indicator in operable communication with the actuator sleeve, the jam indicator including:

an indicator housing;

a plunger extending from a first housing end of the indicator housing and axially movable relative to the indicator housing, the plunger biased into an axially extended position relative to the indicator housing via a plunger biasing element, the plunger configured to be axially displaced via an axial force applied to a plunger tip;

a push button disposed at a second housing end of the indicator housing and axially moveable relative to the indicator housing, the push button biased toward an axially extended position relative to the indicator housing via a button biasing element;

a retaining assembly configured to retain the push button in an axially retracted position relative to the indicator housing;

wherein the retaining assembly is configured to release the push button and allow the button biasing element to urge the push button toward the axially extended position when the plunger is urged toward a retracted position via via the axial force applied to the plunger tip, thereby indicating that the actuator has been subjected to one of an overtorque or jam condition;

wherein the indicator housing includes:

an outer sleeve; and an inner sleeve disposed radially inboard of the outer sleeve:

wherein the push button is located radially between the outer sleeve and the inner sleeve; and wherein the inner sleeve is located radially between the plunger and the push button;

wherein the retaining assembly includes:

one or more retaining balls disposed in a ball opening in the inner sleeve; and one or more retaining elements extending radially inwardly from the indicator housing to interact with the one or more retaining balls and retain the push button in the retracted position;

wherein the plunger includes a pocket configured such that, when the plunger is urged toward a retracted position, the retaining balls are free to move radially inwardly into said pocket, thereby releasing the push button and allowing the button biasing element to urge the push button toward the axially extended position.

12. The system of claim 11, wherein the one or more retaining balls are configured to move radially inwardly when the plunger is urged toward the retracted position, thus releasing the push button.

13. The system of claim 11, wherein the one or more retaining elements includes one or more disc springs or one or more tine springs.

14. The system of claim 11, wherein the button biasing element is axially retained between an indicator housing end and a flange of the push button.

* * * * *